United States Patent
Whitehead et al.

(10) Patent No.: US 11,732,801 B2
(45) Date of Patent: Aug. 22, 2023

(54) SELF-CONTAINED LOW LOAD NARROW GROOVE SEAL

(71) Applicant: Parker-Hannifin Corporation, Cleveland, OH (US)

(72) Inventors: Edward B. Whitehead, Dearborn, MI (US); Adam W. Pylant, Smyrna, TN (US); Bonham X. Ekleberry, Dallas, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 102 days.

(21) Appl. No.: 16/791,103

(22) Filed: Feb. 14, 2020

(65) Prior Publication Data

US 2020/0263791 A1  Aug. 20, 2020

Related U.S. Application Data

(60) Provisional application No. 62/845,454, filed on May 9, 2019, provisional application No. 62/807,968, filed on Feb. 20, 2019.

(51) Int. Cl.
*F16J 15/02* (2006.01)
*F16J 15/10* (2006.01)

(52) U.S. Cl.
CPC ........... *F16J 15/025* (2013.01); *F16J 15/027* (2013.01); *F16J 15/104* (2013.01)

(58) Field of Classification Search
CPC ........ F16J 15/022; F16J 15/024; F16J 15/025; F16J 15/027; F16J 15/104
See application file for complete search history.

(56) References Cited

U.S. PATENT DOCUMENTS 3,048,415 A   8/1962   Shook
3,166,332 A   1/1965   Olson
(Continued)

FOREIGN PATENT DOCUMENTS

DE   102005002913   8/2006
DE   102008032572   2/2010
(Continued)

OTHER PUBLICATIONS

Parker-Hannifin Corporation; "H-Seals"; Apr. 2, 2019; http:ph.parker.com/us/en/h-seals.
(Continued)

*Primary Examiner* — Nicholas L Foster
(74) *Attorney, Agent, or Firm* — Renner, Otto, Boisselle & Sklar, LLP

(57) ABSTRACT

A friction fit seal provides enhanced stability and installation as compared to conventional configurations. The seal includes a seal body having a longitudinal axis; a retention rib that extends from the seal body in a lateral direction perpendicular to the longitudinal axis; and at least one stabilizer rib that extends from the seal body in the lateral direction and is spaced apart from the retention rib along the longitudinal axis. A lateral width of the stabilizer rib in the lateral direction is smaller than a lateral width of the retention rib. The seal may be a keyhole seal in which the seal body includes an inner surface and an outer surface, and the inner surface defines a hollow center that may be keyhole shaped. The seal may include a solid central main body, and the stabilizer ribs and the retention rib are configured as lobes that extend in the lateral direction from the solid central main body.

13 Claims, 3 Drawing Sheets

(56) References Cited

U.S. PATENT DOCUMENTS

| | | | |
|---|---|---|---|
| 3,231,289 A | 1/1966 | Carrell | |
| 3,472,523 A * | 10/1969 | Carlson, Jr. | F16J 15/024 277/649 |
| 4,508,355 A * | 4/1985 | Ditcher | E03F 3/04 277/605 |
| 4,572,522 A | 2/1986 | Smagatz | |
| 5,217,237 A * | 6/1993 | Westhoff | F16L 5/025 277/605 |
| 5,627,342 A | 5/1997 | Kramer | |
| 5,687,976 A * | 11/1997 | Andrick | F16J 15/027 277/605 |
| 5,997,006 A * | 12/1999 | Westhoff | F16L 5/02 277/604 |
| 6,102,448 A * | 8/2000 | Fixemer | F16L 37/113 277/626 |
| 6,161,839 A * | 12/2000 | Walton | F01D 17/105 277/345 |
| 6,343,623 B2 * | 2/2002 | Hegler | F16L 25/0036 285/903 |
| 6,557,857 B1 | 5/2003 | Goodman | |
| 6,719,302 B2 * | 4/2004 | Andrick | F16L 25/0036 277/626 |
| 6,783,193 B2 | 8/2004 | Yamaguchi et al. | |
| 6,802,513 B2 * | 10/2004 | Ranzau | F16J 15/025 277/641 |
| 6,948,718 B2 * | 9/2005 | Shaffer | F16L 21/03 277/604 |
| 7,007,954 B2 * | 3/2006 | Travers | F16J 15/025 277/644 |
| 7,445,403 B2 * | 11/2008 | Williams | E02B 3/16 404/6 |
| 7,487,616 B2 * | 2/2009 | Deaver | B60J 10/24 277/648 |
| 8,783,694 B2 * | 7/2014 | Matsuo | F16J 15/106 277/642 |
| 8,794,639 B2 * | 8/2014 | Westhoff | E03F 3/04 277/645 |
| 8,814,170 B2 | 8/2014 | Okamura et al. | |
| 8,910,950 B2 * | 12/2014 | Deaver | B60J 10/80 49/303 |
| 9,382,808 B2 * | 7/2016 | Hodgkinson | F16J 15/0893 |
| 9,714,707 B2 | 7/2017 | Hettle | |
| 9,746,112 B2 | 8/2017 | Knapp | |
| 10,107,398 B2 | 10/2018 | Tomlinson et al. | |
| 10,175,636 B2 * | 1/2019 | Yoshitsugu | F16J 15/025 |
| 10,520,094 B2 * | 12/2019 | Rommann | F16J 15/3236 |
| 10,794,064 B2 * | 10/2020 | Tuynman | F16J 15/025 |
| 2001/0027818 A1 * | 10/2001 | Hegler | F16L 21/035 138/109 |
| 2003/0001343 A1 * | 1/2003 | Andrick | F16L 25/0054 277/616 |
| 2004/0222597 A1 * | 11/2004 | Benecke | F16L 25/0054 277/602 |
| 2006/0220328 A1 * | 10/2006 | Deaver | B60J 10/25 277/644 |
| 2007/0077123 A1 * | 4/2007 | Williams | E02B 3/16 405/107 |
| 2008/0303224 A1 * | 12/2008 | Knapp | F16J 15/061 277/627 |
| 2009/0102140 A1 * | 4/2009 | Deaver | B60J 10/25 277/644 |
| 2010/0270745 A1 * | 10/2010 | Hurlbert | F16J 15/121 277/637 |
| 2011/0031704 A1 | 2/2011 | Lehr et al. | |
| 2014/0217680 A1 * | 8/2014 | Mori | F16J 15/061 277/594 |
| 2015/0233261 A1 * | 8/2015 | Hodgkinson | F01D 11/005 277/594 |
| 2017/0248900 A1 * | 8/2017 | Yoshitsugu | G03G 15/6502 |
| 2018/0080564 A1 * | 3/2018 | Tanner | F16J 15/027 |
| 2018/0156366 A1 | 7/2018 | Kury | |
| 2018/0251971 A1 * | 9/2018 | Tuynman | F16J 15/027 |
| 2020/0340583 A1 * | 10/2020 | Whitehead | F16J 15/022 |
| 2021/0079791 A1 * | 3/2021 | Andrick | E21D 11/083 |

FOREIGN PATENT DOCUMENTS

| | | |
|---|---|---|
| DE | 102017209027 | 12/2017 |
| JP | 2012092298 | 5/2012 |
| KR | 100680544 | 2/2007 |

OTHER PUBLICATIONS

Parker-Hannifin Corporation; "ParFab Design Guide Extruded and Hot Vulcanized Gaskets, TechSeal Division—TSD 5420"; Apr. 2014; www.parker.com/techseal.

Parker-Hannifin Corporation; "Self-Retaining Seals, Friction-Fit and Press-in-Place Series"; May 2014.

Parker-Hannifin Corporation; "X-Rings"; Apr. 2, 2019; http:ph.parker.com/us/en/x-rings.

* cited by examiner

SELF-CONTAINED LOW LOAD NARROW GROOVE SEAL

RELATED APPLICATIONS

This application claims the benefit of U.S. Provisional Application Nos. 62/845,454 filed on May 9, 2019, and 62/807,968 filed on Feb. 20, 2019, the contents of which are incorporated herein by reference.

FIELD OF INVENTION

The present application relates generally to self-contained low load seals that are designed for narrow groove applications.

BACKGROUND OF THE INVENTION

In several industries including, for example, automotive and heavy-duty equipment industries, component covers are getting progressively larger for housings for various components such as batteries and other components. These components need sealing. For serviceable sealing, elastomeric solutions are preferred. Due to assembly and service methods, seal retention and seal stability are required for such seals. Previous sealing solutions include molded press-in-place seals that can be expensive and exhibit a higher load, extruded solid seals that are higher load but can have installation and stability issues, and hollow diamond seals that have stability issues and/or still have higher loads. Higher loads require more fasteners and stiffer covers, adding cost.

In many such applications, friction fit extruded seal configurations are provided, whereby an elastomeric seal is pressed into a narrow groove formed in one of the components being sealed. Friction fit seals may employ a ribbed configuration in which the ribs tend to have an equal width that is greater than the groove width to provide for compression during a press-fit installation. Conventional ribbed configurations, however, have encountered stability and installation deficiencies by which the seal can get caught on the top of the groove during installation, which can undermine the seal performance.

SUMMARY OF THE INVENTION

There is a need in the art, therefore, for an improved friction fit, elastomeric seal that provides effective sealing with enhanced seal stability as compared to conventional configurations. In exemplary embodiments of the present application, a friction fit seal configuration provides advantages over conventional configurations by employing two different-width rib structures. The seal includes stabilizer ribs on opposing sides of a retention rib located centrally in the seal configuration. The stabilizer ribs keep the seal from tipping over or rotating without significantly increasing load or volume fill. The retention rib provides press fit interference for good seal retention. Rounded sealing surfaces are provided at opposing first and second longitudinal ends of the seal, which aid in providing stability and distributing seal pressure for maximum contact width with minimal load. The seal may be made of an extruded and/or molded elastomeric material as are commonly used in sealing applications such as the applications referenced above. An example usage (non-limiting) is to seal covers for large batteries being incorporated into automotive applications. The seal may have a keyhole configuration on the inner surface of the seal, which keeps the load low while still providing good seal pressure. For higher pressure or higher load applications, the seal may have a solid configuration and a lobed outer surface, whereby lobes form the ribs of different width to act as the stabilizer and retention ribs.

As referenced above, in typical friction fit extruded or molded seal configurations, the various ribs tend to have an equal width, and such equal width is greater than the groove width to provide for compression during a press-fit installation. The press-fit provides self-energizing of the seal that generates a friction fit for effective seal retention, but the use of equal width ribs has resulted in stability deficiencies by which the seal can get caught on the top of the groove during installation, which can undermine the seal performance. In the seal configurations of the present application, in contrast, the retention rib performs the friction or press-fit function, and the stabilizer ribs have a smaller width than the retention rib to provide for enhanced stability during installation. Accordingly, installation stability is improved over conventional configurations while maintaining effective retention.

An aspect of the invention, therefore, is a friction fit seal that provides enhanced installation stability as compared to conventional configurations. In exemplary embodiments, a seal includes a seal body having a longitudinal axis; a retention rib that extends from the seal body in a lateral direction perpendicular to the longitudinal axis; and at least one stabilizer rib that extends from the seal body in the lateral direction and is spaced apart from the retention rib along the longitudinal axis. A lateral width of the stabilizer rib in the lateral direction is smaller than a lateral width of the retention rib. In an exemplary embodiment, the seal may be a keyhole seal in which the seal body includes an inner surface and an outer surface, and the inner surface defines a hollow center that may be keyhole shaped. In another exemplary embodiment, the seal may include a solid central main body, and the stabilizer ribs and the retention ribs are configured as lobes that extend in the lateral direction from the solid central main body.

The seal according to any of the embodiments may be employed in a sealed assembly including a first component having a first mating surface that defines a sealing groove, the seal according to any of the embodiments wherein the seal is located within the sealing groove, and a second mating component having a second mating surface. The seal is reconfigured from a non-compressed state to a compressed state when the first component is joined with the second component, and in the compressed state the seal seals at a junction between the first mating surface and the second mating surface.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
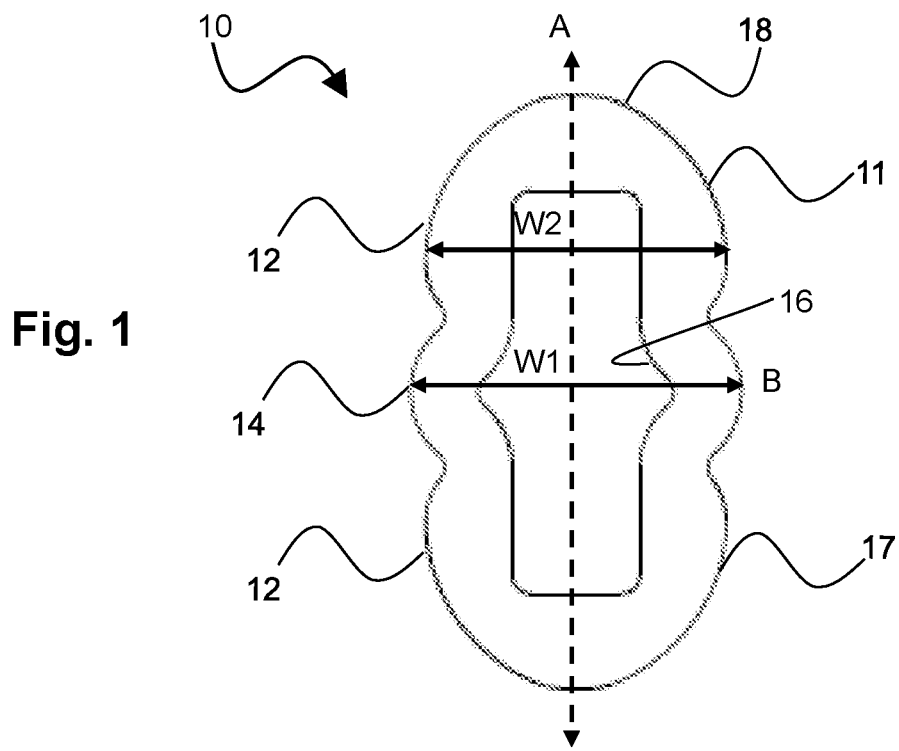
FIG. 1 is a drawing depicting an exemplary seal configuration in accordance with embodiments of the present application.

Embodiments of the present invention will now be described with reference to the drawings, wherein like reference numerals are used to refer to like elements throughout. It will be understood that the figures are not necessarily to scale.

FIG. 1 is a drawing depicting an exemplary seal 10 in accordance with embodiments of the present application. The seal configuration provides advantages over conventional configurations by employing two different-width rib structures, which enhance the stability of the seal.

An aspect of the invention is a friction fit seal that provides enhanced stability as compared to conventional configurations. In exemplary embodiments, a seal includes a seal body having a longitudinal axis; a retention rib that extends from the seal body in a lateral direction perpendicular to the longitudinal axis; and at least one stabilizer rib that extends from the seal body in the lateral direction and is spaced apart from the retention rib along the longitudinal axis. A lateral width of the stabilizer rib in the lateral direction is smaller than a lateral width of the retention rib. In an exemplary embodiment, the seal may be a keyhole seal in which the seal body includes an inner surface and an outer surface, and the inner surface defines a hollow center that may be keyhole shaped. In another exemplary embodiment, the seal may include a solid central main body, and the stabilizer ribs and the retention rib are configured as lobes that extend in the lateral direction from the solid central main body.

Referring to FIG. 1, a longitudinal axis "A" is defined, which runs along a length or longitudinal direction of the seal 10. Along the longitudinal direction along the longitudinal axis A, the seal 10 includes a seal body 11 from which there extends at least one stabilizer rib and an least one retention rib, wherein the retention rib has a first lateral width W1 in a direction perpendicular to the longitudinal axis A (also referred to as the lateral direction) greater than a second lateral width W2 of the at least one stabilizer rib. In other words, the lateral width W2 of the stabilizer rib(s) in a lateral direction perpendicular to the longitudinal axis is smaller than a lateral width W1 of the retention rib. In the specific example of FIG. 1, on each side of the longitudinal axis A, the seal 10 includes, extending from the seal body 11, two stabilizer ribs 12, one each being located on opposing sides in the longitudinal direction of a retention rib 14 located centrally in the seal configuration relative to the stabilizer ribs. Accordingly, the seal 10 may be symmetrical about the longitudinal axis A, and also may be symmetrical about a central lateral axis B perpendicular to the longitudinal axis. The stabilizer ribs 12 keep the seal balanced and prevent the seal from rotating or rolling within the sealing grove without significantly increasing load or volume fill. The retention rib 14 provides a press fit interference within a narrow sealing groove of an equipment component for good seal retention.

As depicted in the example of FIG. 1, the seal 10 may have an inner surface 16 opposite from an outer surface 17. In this manner, the seal 10 has a hollowed configuration. In exemplary embodiments as illustrated in FIG. 1, the inner surface 16 may define a keyhole configuration or shape, by which seal material is absent in the center of the seal so as to form said keyhole configuration. For relatively low load or low-pressure applications, the keyhole configuration maintains the load low while still providing good seal pressure. Rounded sealing surfaces 18 are provided at opposing first and second longitudinal ends of the seal 10, which aid in providing stability and distributing seal pressure for maximum contact surface against the components being sealed, with minimal load.

Figure 2:
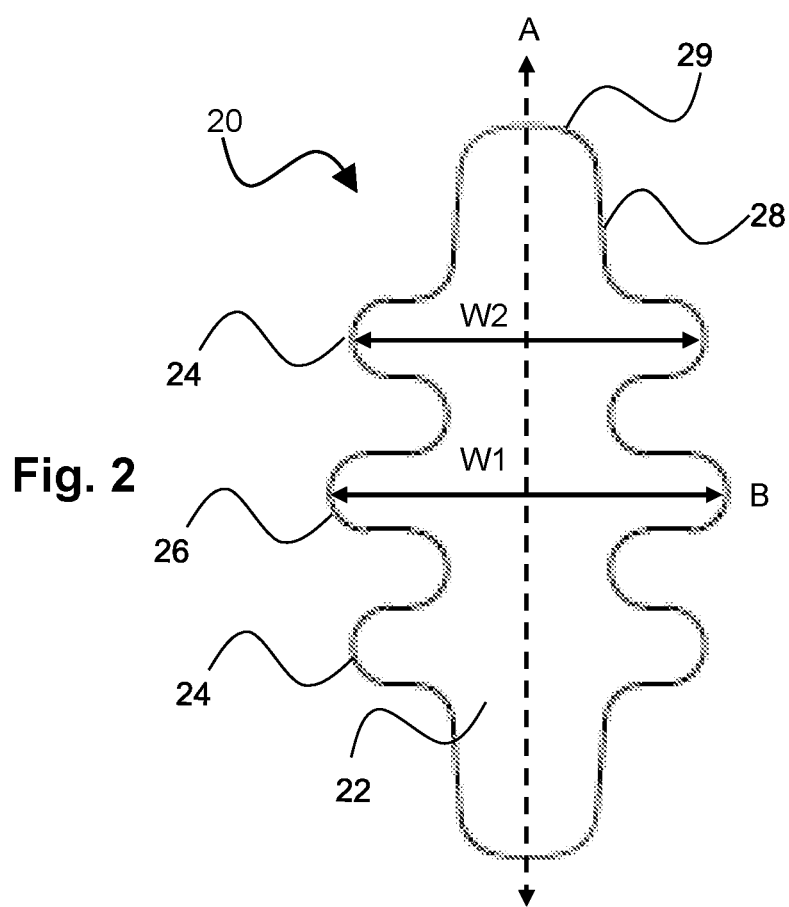
FIG. 2 is a drawing depicting another exemplary seal configuration in accordance with embodiments of the present application.

FIG. 2 is a drawing depicting another exemplary seal 20 in accordance with embodiments of the present application. Similar to the previous embodiments, the seal configuration 20 provides advantages over conventional configurations by employing two different-width rib structures, which enhances the stability of the seal. Referring to FIG. 2, along the longitudinal direction along the longitudinal axis A, the seal 20 includes at least one stabilizer rib and an least one retention rib, wherein the retention rib has a first lateral width W1 in the lateral direction perpendicular to the longitudinal axis A greater than a second lateral width W2 of the stabilizer rib. In other words, the lateral width W2 of the stabilizer rib(s) in a lateral direction perpendicular to the longitudinal axis is smaller than a lateral width W1 of the retention rib. In the specific example of FIG. 2, the seal 20 has a central body 22 from which there extends a plurality of lobe structures that form the rib configuration. In this example, on each side of the longitudinal axis A, the seal 20 includes two first lobes 24 that act as stabilizer ribs, one each being located on opposing sides in the longitudinal direction of a second lobe 26 that acts as a retention rib and is located centrally in the seal configuration relative to the stabilizer ribs 24. Accordingly, the seal 20 also may be symmetrical about the longitudinal axis A, and also may be symmetrical about a lateral axis B perpendicular to the longitudinal axis. Similarly as in the previous embodiment, the first lobes 24 that act as the stabilizer ribs keep the seal balanced and prevent the seal from rotating or rolling within the sealing grove without significantly increasing load or volume fill. The lobe 26 that acts as the retention rib provides press fit interference within a narrow sealing groove of an equipment component for good seal retention.

The embodiment of FIG. 2 differs from the embodiment of FIG. 1 in that the seal 20 includes a solid central main body 22, and the lobes 24 and 26 that constitute the rib structure are defined by an outer surface 28 and extend from the central main body 22. The seal 20 thus has a solid central main body 22 from which the lobes 24 and 26 extend, rather than the hollowed keyhole configuration of FIG. 1. The use of the solid seal configuration is preferred for applications that experience relatively high-pressure at which a keyhole configuration may collapse and not provide an effective seal. For the solid configuration of seal 20, rounded sealing surfaces 29 also are provided at opposing first and second longitudinal ends of the seal 20, which aid in providing stability and distributing seal pressure for maximum contact surface against the components being sealed.

The seals 10/20 may be made of an extruded and/or molded elastomeric material as are commonly used in sealing applications. The seals 10/20 may be made of any resilient compressible elastomer material that is suitable for friction-fit sealing applications, such as for example an inorganic polymer, an organic polymer, a copolymer, a fluoropolymer, a polyester, a rubber, a silicone rubber, a synthetic rubber, a vinyl polymer, or a terpolymer of ethylene. Accordingly, the sealing groove may be any shape as appropriate for a given application. An example usage (non-limiting) is to seal covers for large batteries being incorporated into automotive applications, and more generally exemplary usages may include sealed housing components, lids, covers, and the like.

As referenced above, in typical friction fit extruded or molded seal configurations, the various ribs tend to have an equal width, and such equal width is greater than the groove width when the seal is in a non-compressed state to provide for compression during a press-fit installation. The press-fit provides self-energizing of the seal that generates a friction fit for effective seal retention, but the use of equal width ribs has resulted in stability deficiencies by which the seal can get caught on the top of the groove during installation, which can undermine the seal performance. In the seal configurations of the present application, the retention rib has a lateral width W1 as shown in FIGS. 1 and 2, which in a non-compressed state is greater than the groove width to perform the friction or press-fit function. In addition, in contrast to conventional configurations, in embodiments of the present application the stabilizer ribs have a lateral width W2 that is smaller than a lateral width W1 of the retention rib to provide for enhanced installation stability in that the stabilizer ribs do not get caught on the top of the groove during installation. Accordingly, installation stability is improved over conventional configurations while maintaining effective retention.

The seal according to any of the embodiments may be employed in a sealed assembly including a first component having a first mating surface that defines a sealing groove, the seal according to any of the embodiments that is located within the sealing groove, and a second mating component having a second mating surface. The seal is reconfigured from a non-compressed state to a compressed state when the first component is joined with the second component, and in the compressed state the seal seals at a junction between the first mating surface and the second mating surface.

Figure 3:
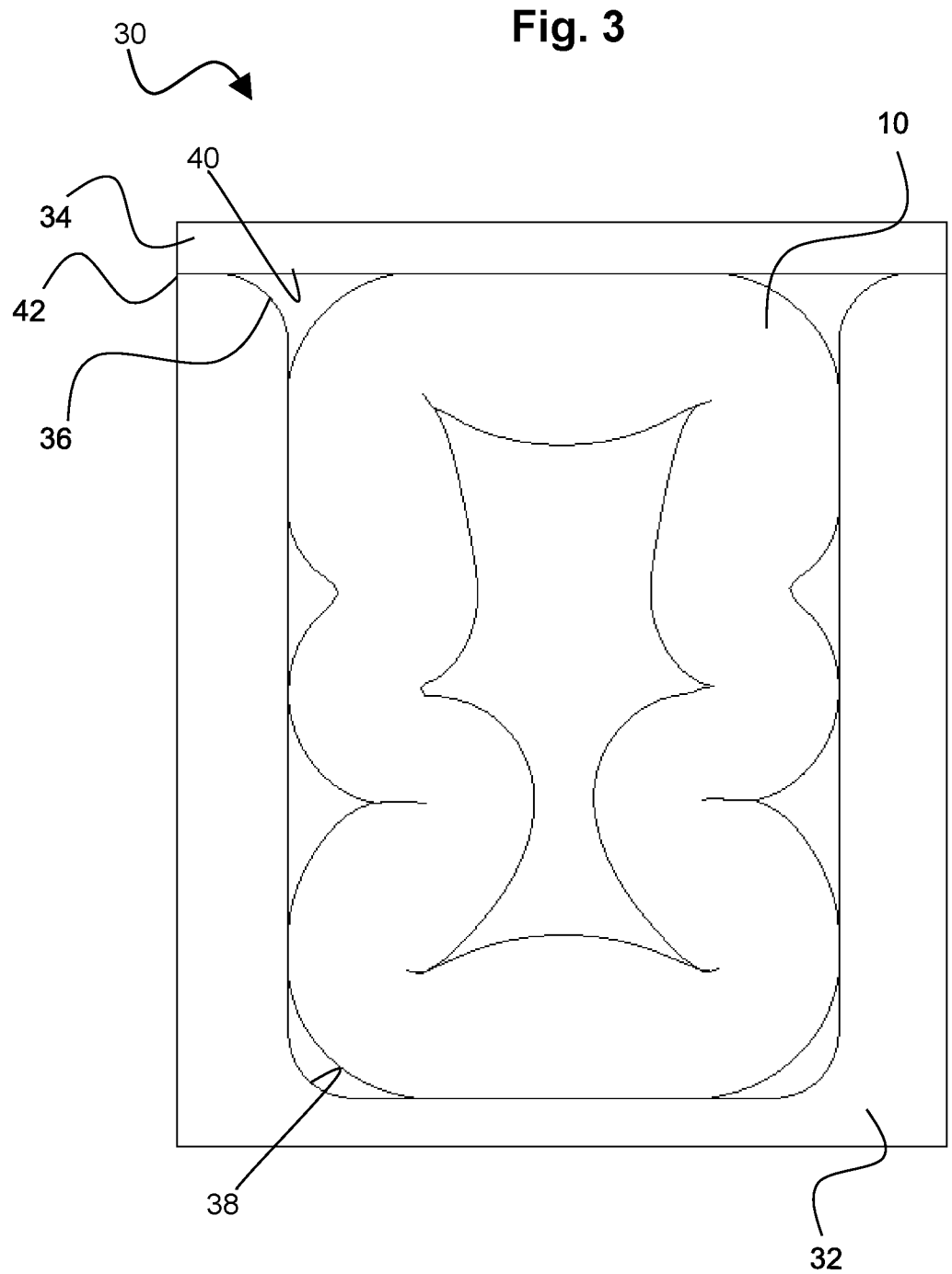
FIG. 3 is a drawing depicting a sealed assembly including the seal configuration of FIG. 1 in a sealing position for sealing mating equipment components.
Figure 4:
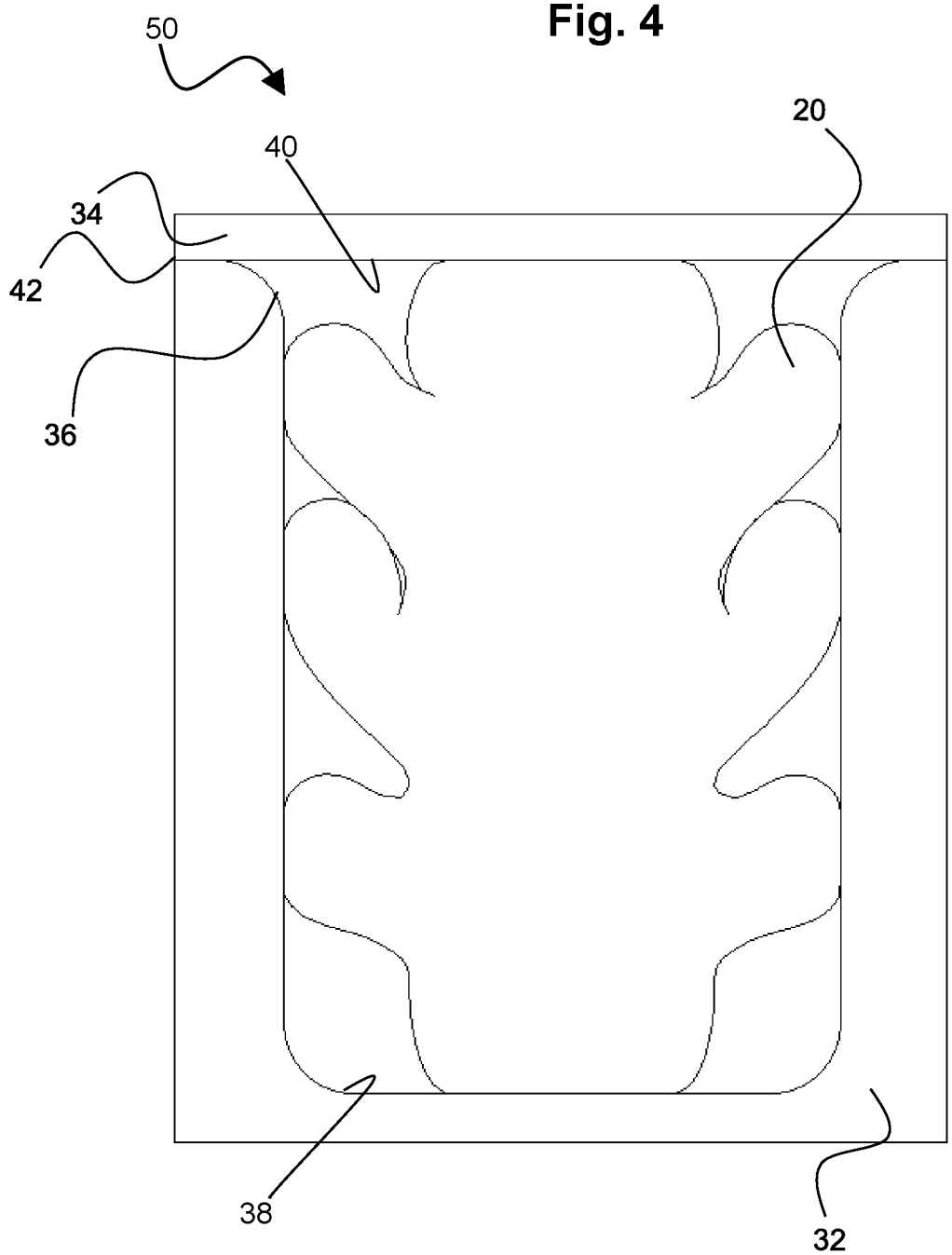
FIG. 4 is a drawing depicting a sealed assembly including the seal configuration of FIG. 2 in a sealing position for sealing the mating equipment components.

FIG. 3 is a drawing depicting a sealed assembly 30 including the seal 10 of FIG. 1 in a sealing position for sealing mating equipment components 32 and 34. FIG. 4 is a drawing depicting a sealed assembly 50 including the seal 20 of FIG. 2 in a sealing position for sealing the mating equipment components 32 and 34. In each of these sealed assemblies 30 and 50, the seals 10 and 20 are shown respectively in a compressed state between the first mating equipment component 32 and the second mating equipment component 34.

The first equipment component 32 includes a first mating surface 36 that extends into and defines a sealing groove 38 that receives the given seal 10 or 20. As referenced above, in the non-compressed state the lateral width of the retention rib is greater than the width of the sealing groove 38 to provide a friction- or press-fit seal configuration. The second equipment component 34 includes a second mating surface 40, wherein the seal 10 or 20 seals at a junction 42 between the two mating equipment components. FIGS. 3 and 4 illustrate the sealed assemblies at essentially full compression, whereby the junction 42 constitutes a substantially gapless interface of the first mating surface 36 of the first mating component 32 against the second mating surface 40 of the second equipment component 34. Depending upon the particular application, the junction 42 may constitute a small gap (e.g., on the order of up to 0.80 mm in a representative application) between the first mating surface 36 and the second mating surface 40, and the seal 10 or 20 is compressed to a degree sufficient to seal the gap.

An aspect of the invention, therefore, is a friction fit seal that provides enhanced installation stability as compared to conventional configurations by employing one or more stabilizer ribs having a width that is smaller than a width of the retention rib. In exemplary embodiments, a seal includes a seal body having a longitudinal axis; a retention rib that extends from the seal body in a lateral direction perpendicular to the longitudinal axis; and at least one stabilizer rib that extends from the seal body in the lateral direction and is spaced apart from the retention rib along the longitudinal axis. A lateral width of the stabilizer rib in the lateral direction is smaller than a lateral width of the retention rib. The seal may include one or more of the following features, either individually or in combination.

In an exemplary embodiment of the seal, the seal includes on each side of the longitudinal axis, first and second stabilizer ribs located on opposing sides of the retention rib along the longitudinal axis, wherein a lateral width of each of the stabilizer ribs is smaller than a lateral width of the retention rib.

In an exemplary embodiment of the seal, the seal body includes an inner surface and an outer surface, and the inner surface defines a hollow center.

In an exemplary embodiment of the seal, the seal has a keyhole shape.

In an exemplary embodiment of the seal, the inner surface defines a keyhole shape hollow center.

In an exemplary embodiment of the seal, the seal comprises a solid central main body, and the at least one stabilizer rib and the retention rib are configured as lobes that extend in the lateral direction from the solid central main body.

In an exemplary embodiment of the seal, the seal is made of an elastomeric material.

In an exemplary embodiment of the seal, the seal further includes rounded sealing surfaces located at opposing longitudinal ends of the seal.

In an exemplary embodiment of the seal, the retention rib is located centrally relative to the stabilizer ribs.

In an exemplary embodiment of the seal, the retention rib and the stabilizer ribs extend from an outer surface of the seal, and the stabilizer ribs extend a smaller distance from a centerline longitudinal axis of the seal as compared to the retention rib.

In an exemplary embodiment of the seal, the seal is symmetrical about the longitudinal axis.

In an exemplary embodiment of the seal, the seal is symmetrical about a lateral axis perpendicular to the longitudinal axis.

Another aspect of the invention is a seal assembly including a first component having a first mating surface that defines a sealing groove, a seal according to any of the embodiments that is located within the sealing groove, and a second mating component having a second mating surface. The seal is reconfigured from a non-compressed state to a compressed state when the first component is joined with the second component, and in the compressed state the seal seals at a junction between the first mating surface and the second mating surface. In exemplary embodiments of the seal assembly, in the non-compressed state, the lateral width of the retention rib is greater than a width of the sealing groove, and/or in a fully compressed state, the junction is a substantially gapless interface of the first mating surface and the second mating surface.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A seal comprising:
   a seal body having a longitudinal axis;
   rounded sealing surfaces of a radial cross-section of the seal body located at opposing longitudinal ends of the seal body in an undeformed state;
   a retention rib that extends from the seal body in a lateral direction perpendicular to the longitudinal axis; and
   at least one stabilizer rib that extends from the seal body in the lateral direction and is spaced apart from the retention rib along the longitudinal axis;
   wherein a lateral width of the stabilizer rib in the lateral direction is smaller than a lateral width of the retention rib;
   wherein the at least one stabilizer rib includes, on each side of the longitudinal axis, first and second stabilizer ribs located on opposing sides of the retention rib along the longitudinal axis, wherein a lateral width of each of the first and second stabilizer ribs is smaller than the lateral width of the retention rib; and
   wherein the seal is symmetrical about the longitudinal axis and a lateral axis perpendicular to the longitudinal axis.

2. The seal of claim 1, wherein the seal body includes an inner surface and an outer surface, and the inner surface defines a hollow center.

3. The seal of claim 2, wherein the seal has a keyhole shape.

4. The seal of claim 2, wherein the inner surface defines a keyhole shape hollow center.

5. The seal of claim 1, wherein the seal comprises a solid central main body, and the at least one stabilizer rib and the retention rib are configured as lobes that extend in the lateral direction from the solid central main body.

6. The seal of claim 1, wherein the seal is made of an elastomeric material.

7. The seal of claim 1, wherein the retention rib is located centrally relative to the at least one stabilizer rib.

8. The seal of claim 1, wherein the retention rib and the at least one stabilizer rib extend from an outer surface of the seal, and the at least one stabilizer rib extends a smaller distance from a centerline longitudinal axis of the seal as compared to the retention rib.

9. A seal assembly comprising:
   a first component having a first mating surface that defines a sealing groove;
   a seal according to claim 1 that is located within the sealing groove; and
   a second mating component having a second mating surface;
   wherein the seal is reconfigured from a non-compressed state to a compressed state when the first component is joined with the second component, and in the compressed state the seal seals at a junction between the first mating surface and the second mating surface.

10. The sealed assembly of claim 9, wherein in the non-compressed state, the lateral width of the retention rib is greater than a width of the sealing groove.

11. The seal assembly according to claim 9, wherein in a fully compressed state, the junction is a substantially gapless interface of the first mating surface and the second mating surface.

12. A seal comprising:
   a seal body having a longitudinal axis;
   rounded sealing surfaces of a radial cross-section of the seal body located at opposing longitudinal ends of the seal body in an undeformed state;
   a retention rib that extends from the seal body in a lateral direction perpendicular to the longitudinal axis; and
   at least one stabilizer rib that extends from the seal body in the lateral direction and is spaced apart from the retention rib along the longitudinal axis;
   wherein a lateral width of the stabilizer rib in the lateral direction is smaller than a lateral width of the retention rib;
   wherein the seal is symmetrical about the longitudinal axis and a lateral axis perpendicular to the longitudinal axis.

13. A seal comprising:
   a seal body having a longitudinal axis, an inner surface defining a keyhole shape hollow center, and an outer surface;
   rounded sealing surfaces of a radial cross-section of the seal body located at opposing longitudinal ends of the seal body;
   a retention rib that extends from the seal body in a lateral direction perpendicular to the longitudinal axis; and
   at least one stabilizer rib that extends from the seal body in the lateral direction and is spaced apart from the retention rib along the longitudinal axis;
   wherein a lateral width of the stabilizer rib in the lateral direction is smaller than a lateral width of the retention rib; and
   wherein the at least one stabilizer rib includes, on each side of the longitudinal axis, first and second stabilizer ribs located on opposing sides of the retention rib along the longitudinal axis, wherein a lateral width of each of the first and second stabilizer ribs is smaller than the lateral width of the retention rib.

\* \* \* \* \*